United States Patent Office 3,608,118
Patented Sept. 28, 1971

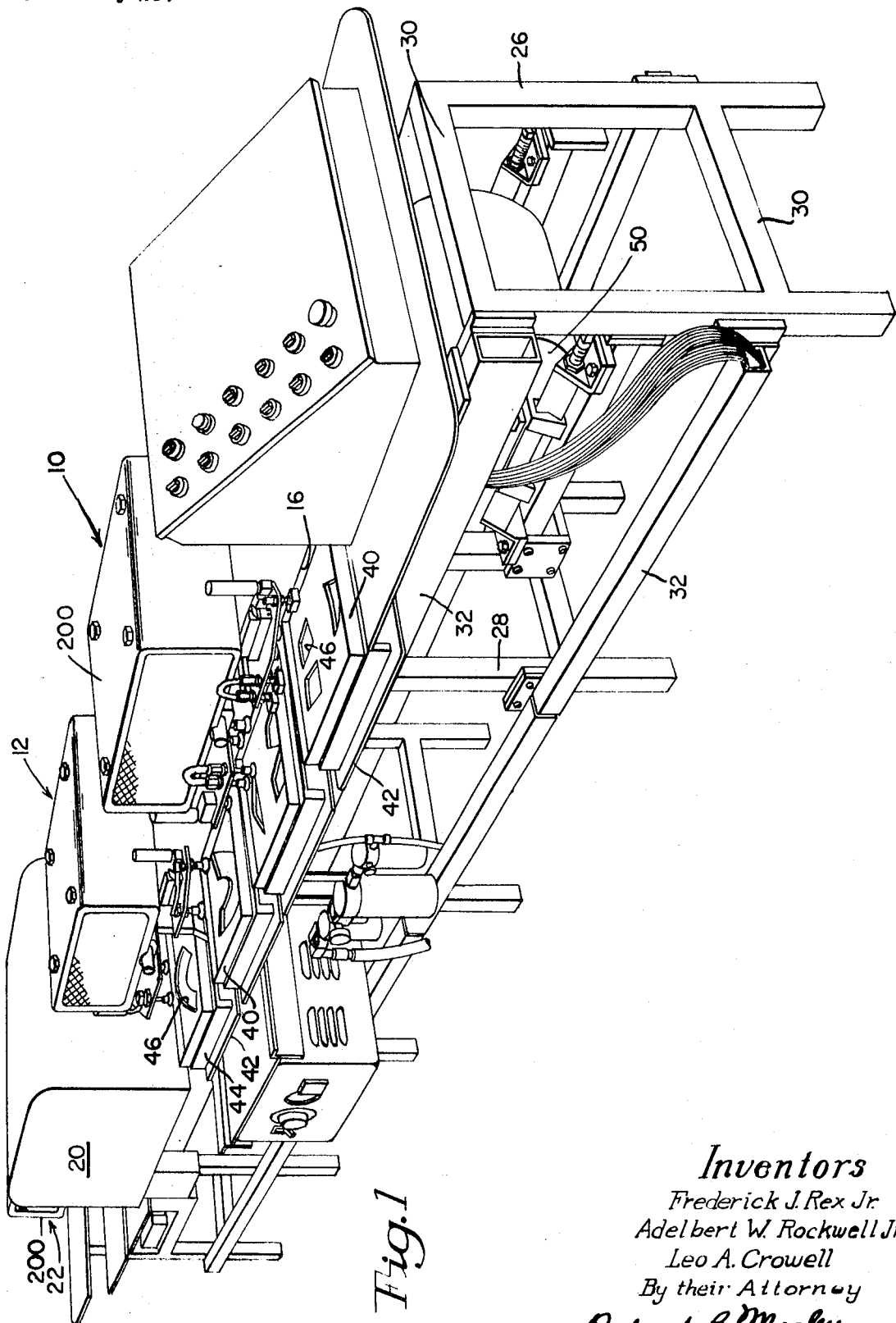

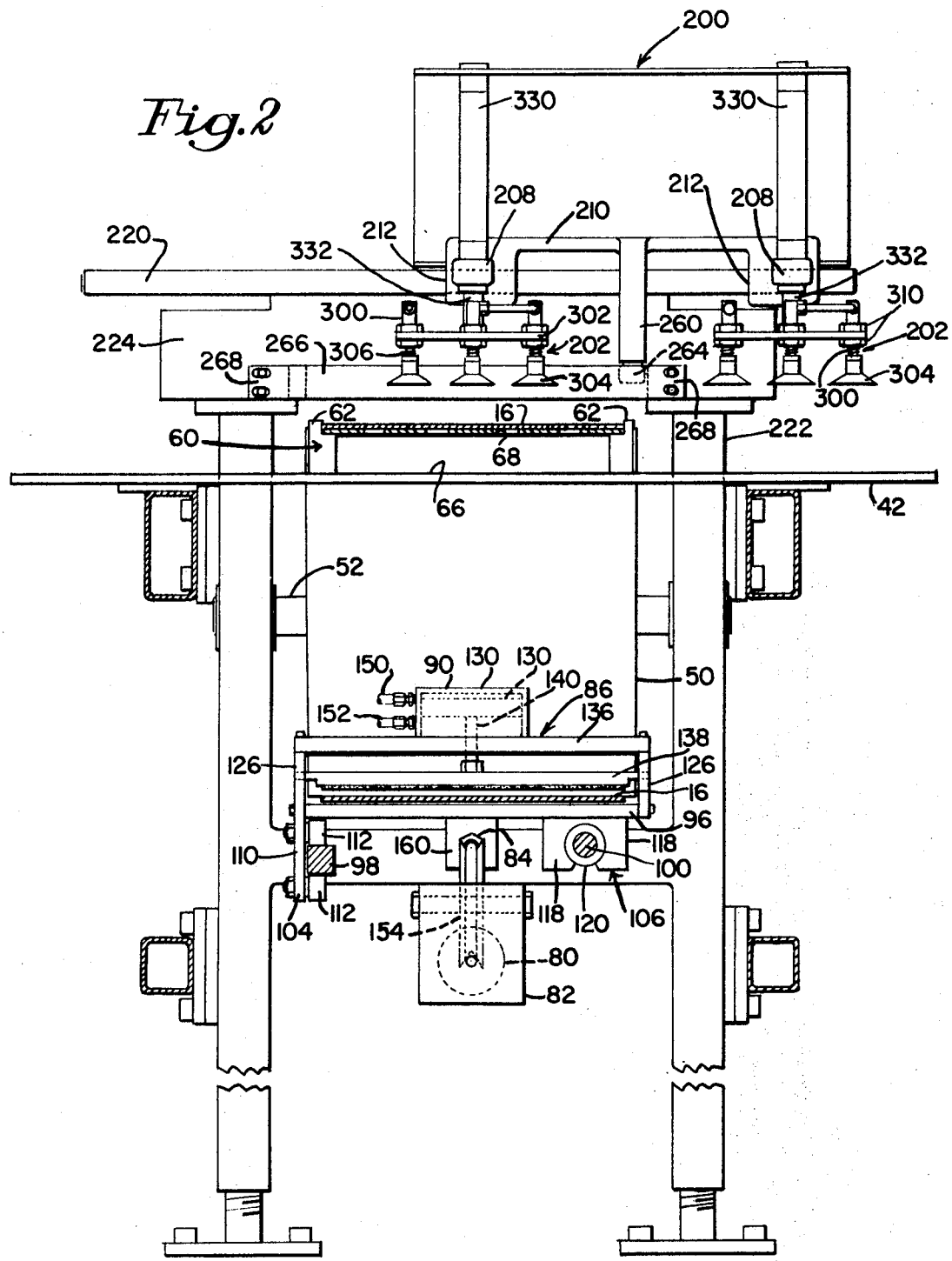

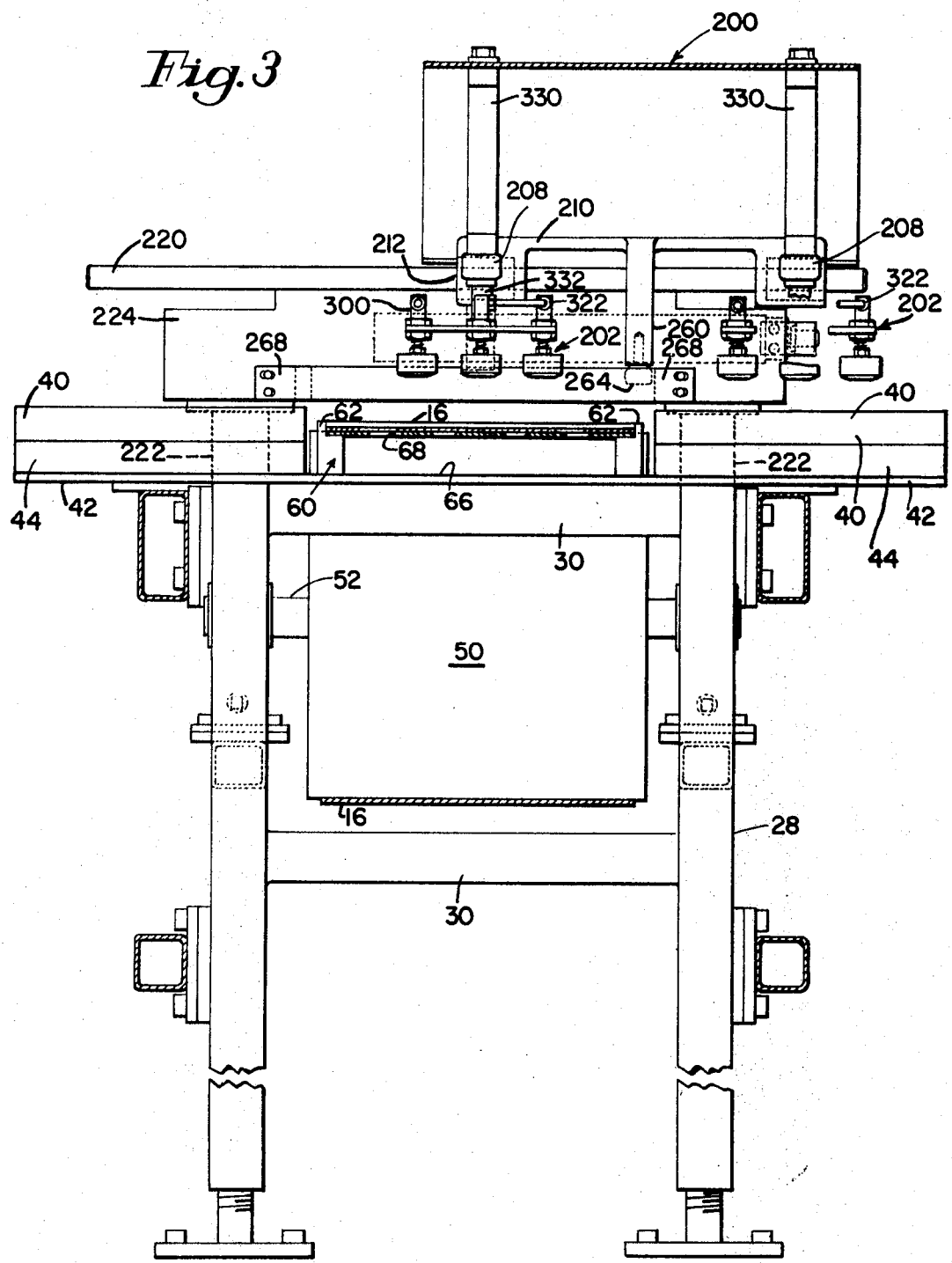

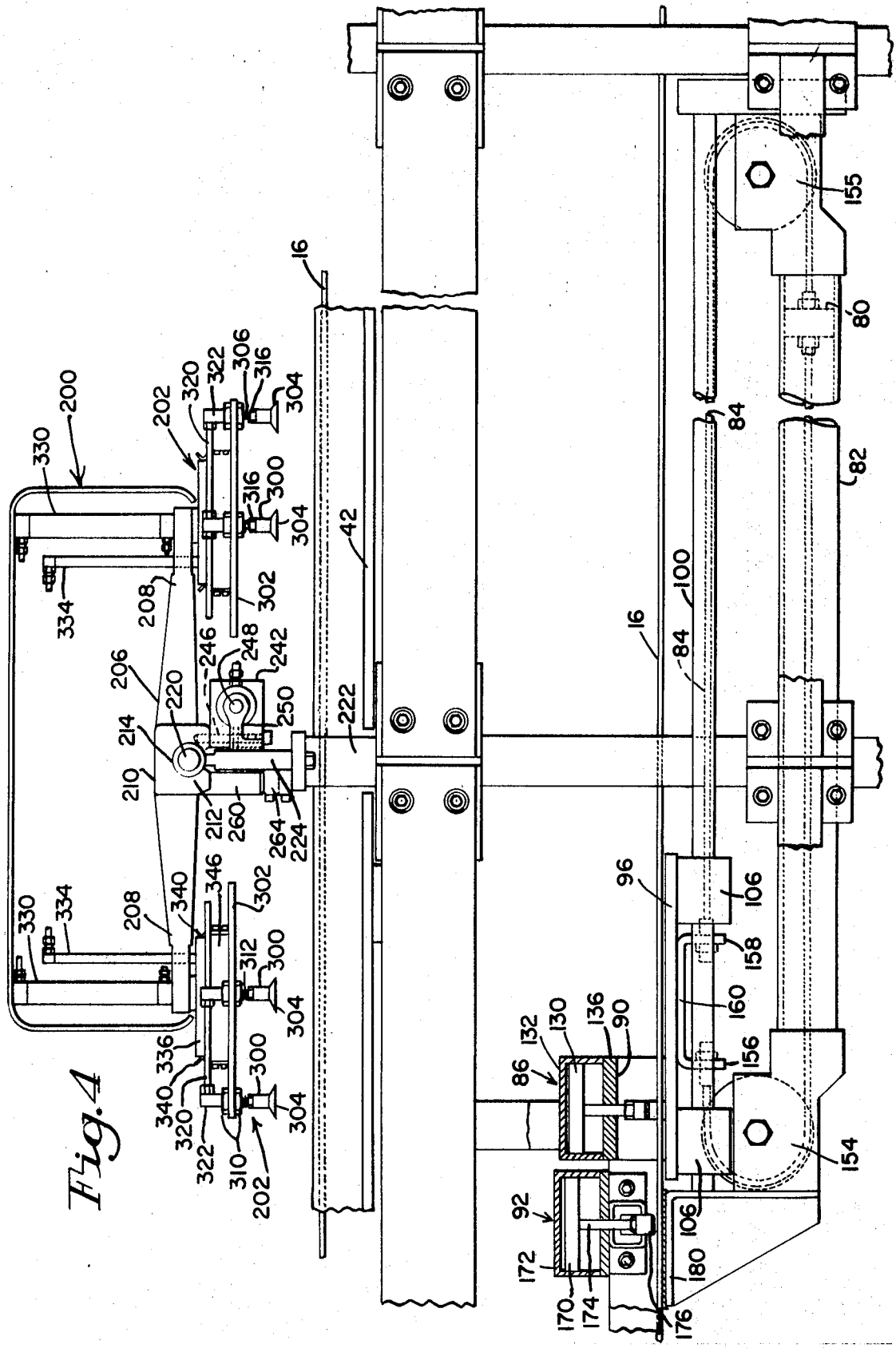

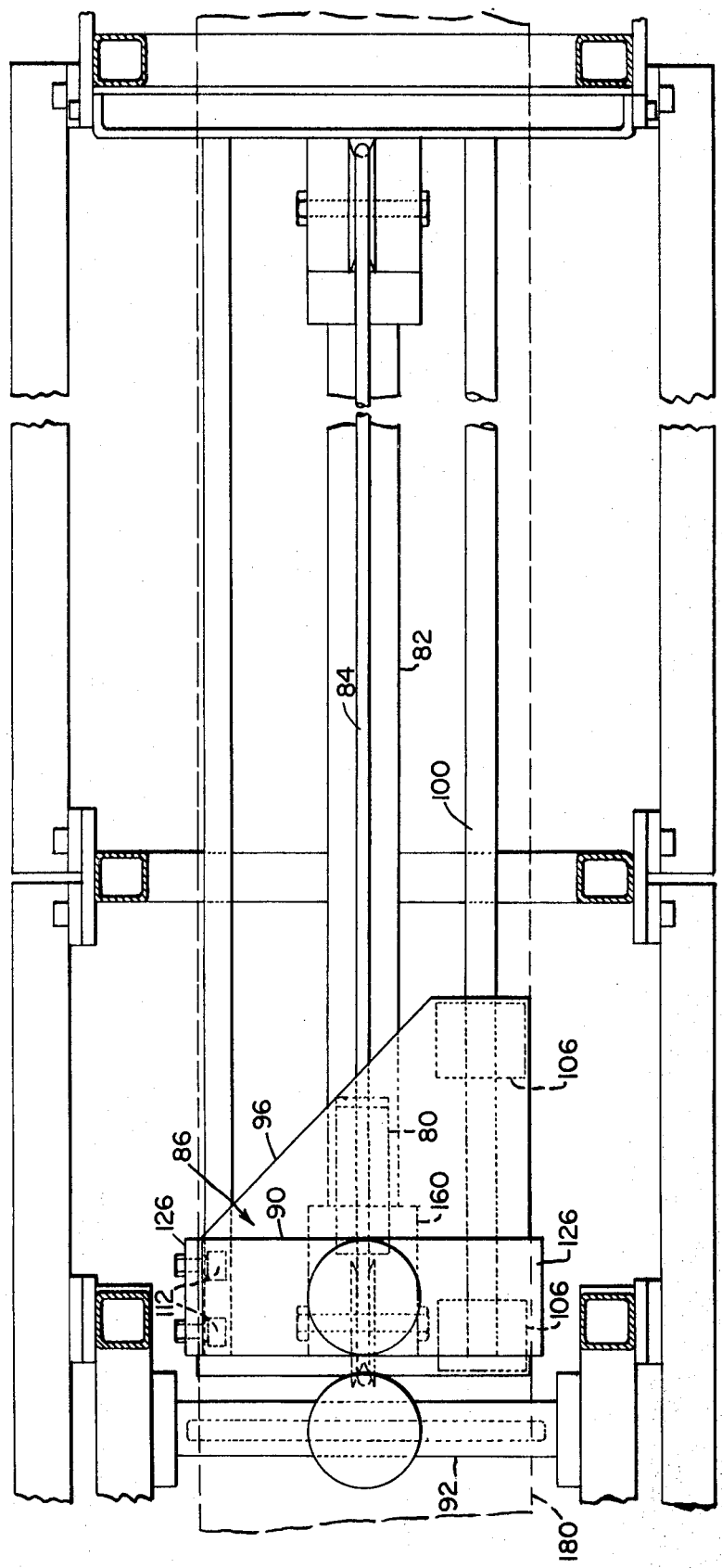

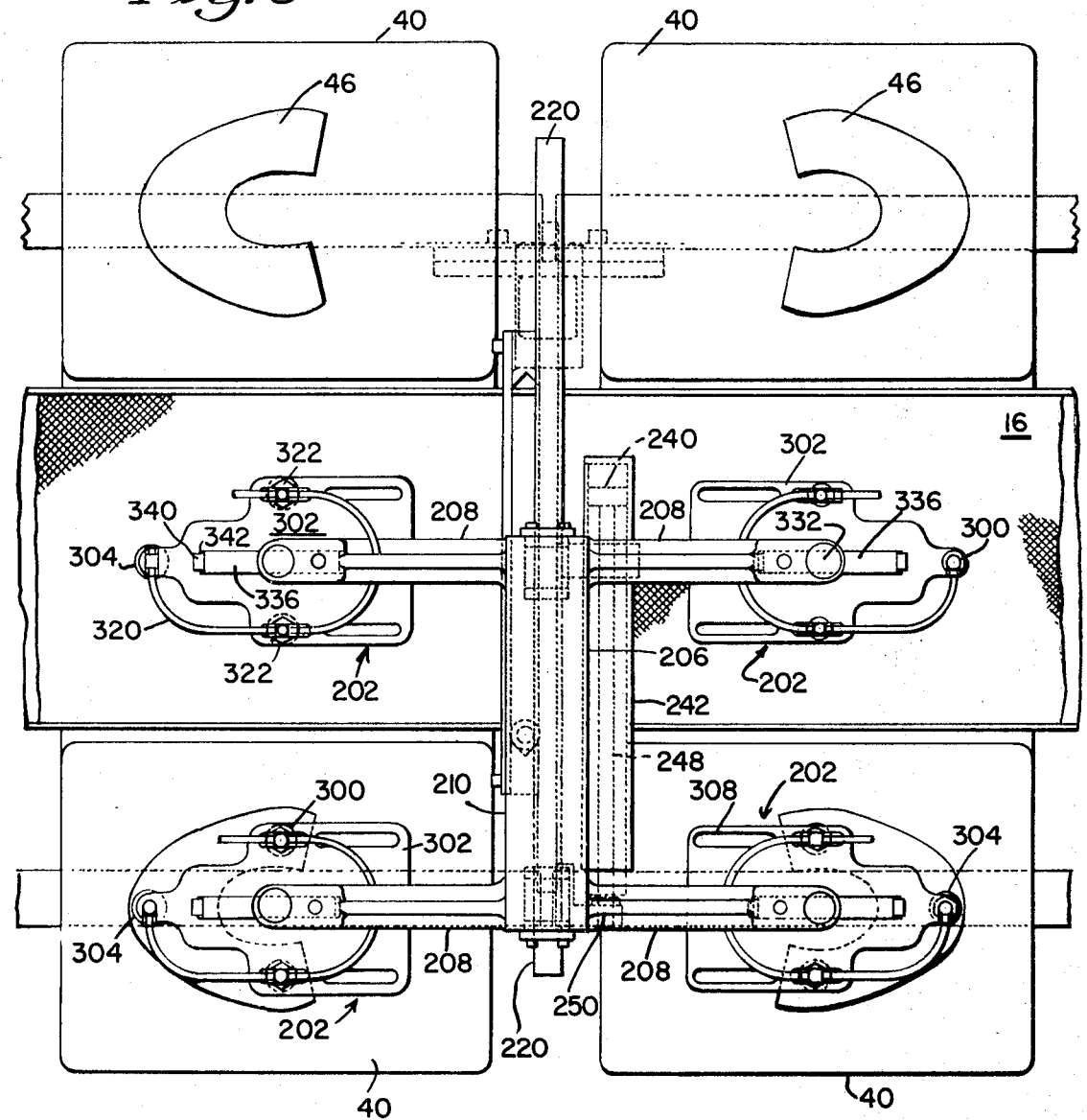

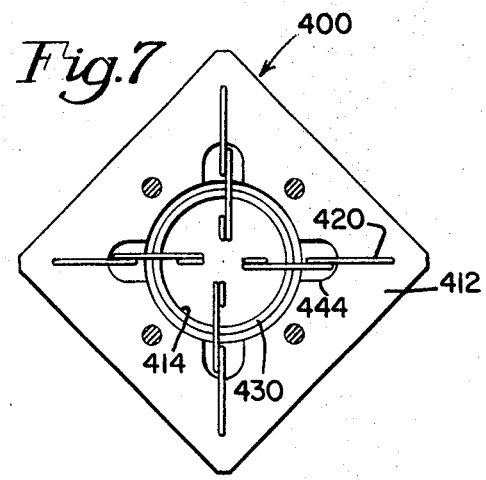
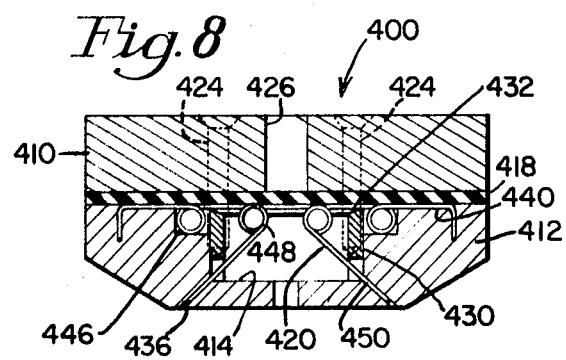
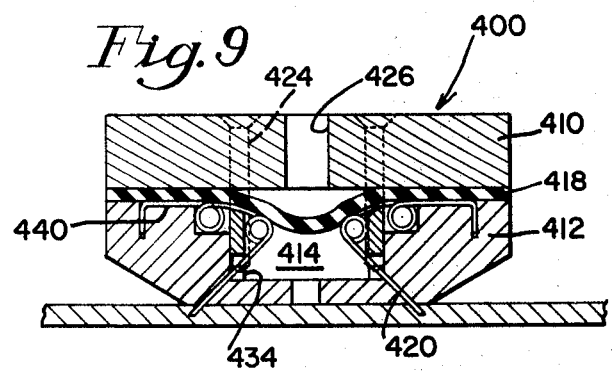
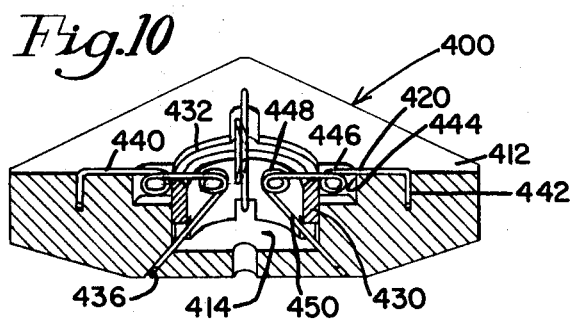

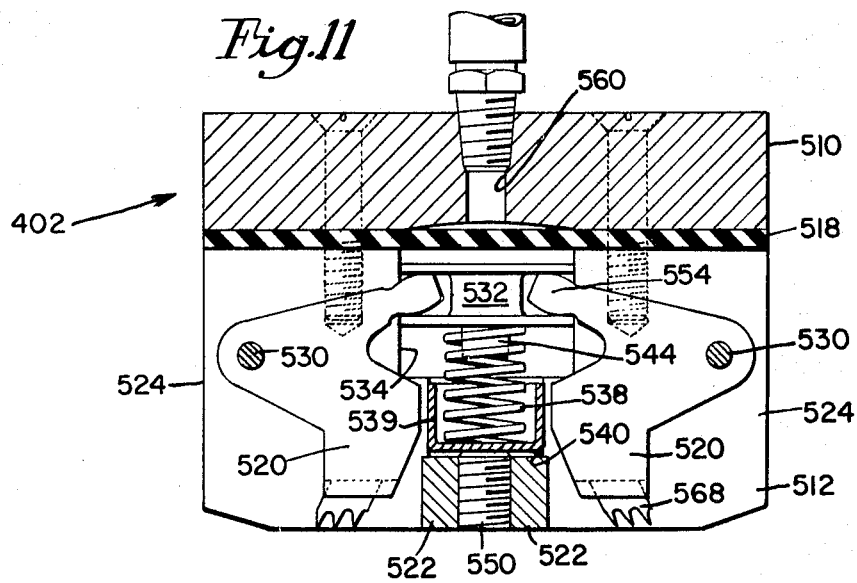
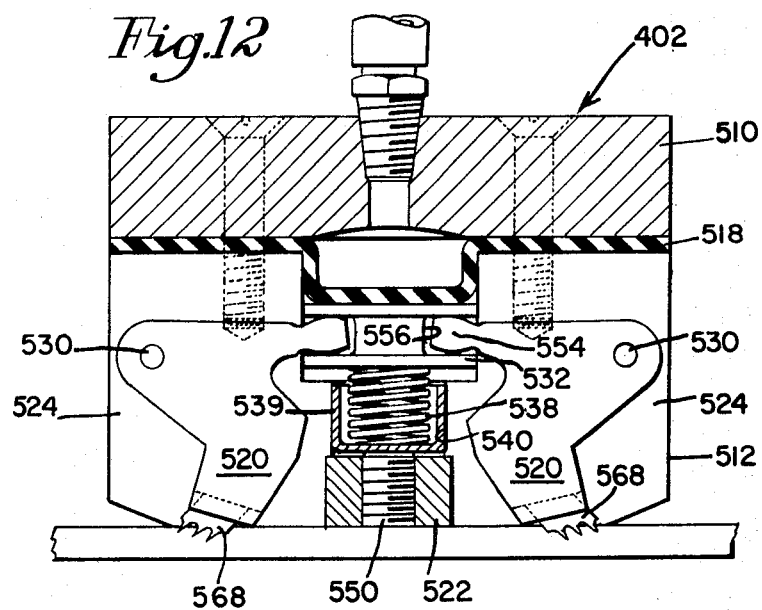

3,608,118
APPARATUS FOR ASSEMBLING ARTICLES OF COMMERCE
Frederick J. Rex, Jr., North Reading, Adelbert W. Rockwell, Jr., Gloucester, and Leo A. Crowell, Hamilton, Mass., assignors to USM Corporation, Boston, Mass.
Filed May 26, 1969, Ser. No. 827,713
Int. Cl. A43d
U.S. Cl. 12—1
10 Claims

ABSTRACT OF THE DISCLOSURE

Apparatus for assembling a multiple component article of commerce, particularly a shoe upper, comprising an intermittently translated conveyor belt, means for precisely locating components of the article relative to the conveyor belt, means for accurately depositing the components at a predetermined position on the conveyor belt and means for retaining the components on the belt during the period of assembly.

FIELD OF THE INVENTION

This invention relates to apparatus for use in the manufacture or assembly of a multi-component article of commerce and, more particularly, to apparatus for automatically positioning or assembling and securing the components of a shoe upper.

BACKGROUND OF THE INVENTION

The fitting room of shoe factories where shoe uppers are assembled has heretofore been an enigma to the application of the technology of automation to the manufacture of shoes. Upper assembly involves the laborious and tedious performance of a variety of operations which require skillful craftsmen. Indeed, it has been estimated that forty (40) percent of the labor costs involved in the manufacture of shoes is in the fitting room. This fact, coupled with a decline in available artisans skilled in the fitting room craft, has made fitting room automation a common area of pursuit for research activity in the shoe art. However, little if any real progress has been made toward even partial automation.

The features and various novel details of construction, will now be more particularly described with reference to the accompanying drawings and pointed out in the claims. It is to be understood that the particular embodiment of the invention shown in the drawings is for illustration purposes only and is not to be construed as a limitation of the invention.

DESCRIPTION OF THE DRAWINGS

FIG. 1 is a perspective view of apparatus embodying features of this invention;

FIG. 2 is an end view of the unload station of the apparatus illustrated in FIG. 1. partly in section, showing the drive means for the conveyor belt of the apparatus;

FIG. 3 is an end view similar to FIG. 2 of an assembly station of the apparatus;

FIG. 4 is a side view of the station and drive means shown in FIG. 2;

FIG. 5 is a plan view of the drive means shown in FIG. 4;

FIG. 6 is a partial plan view of an upper portion of a station of the apparatus of this invention;

FIG. 7 is a plan view of the lower portion of one form of pick-up means used with the apparatus of this invention;

FIG. 8 is a sectional view of the upper and lower portion of the pick-up means partially illustrated in FIG. 7 showing the pick-up members in an inoperative position;

FIG. 9 is a sectional view similar to FIG. 8 showing the pick-up means in an operative position;

FIG. 10 is a perspective view of a section of the lower portion of the pick-up means illustrated in FIG. 7;

FIG. 11 is a sectional view of a second form of pick-up means used with the apparatus of this invention showing the pick-up members in an inoperative position; and FIG. 12 is a sectional view similar to FIG. 11 showing the pick-up members in an operative position.

DESCRIPTION OF THE PREFERRED EMBODIMENTS

The preferred embodiment of this invention illustrated in FIG. 1 comprises a plurality of operating stations sequentially employed to assemble and adhesively bond a shoe upper. The upper components which are assembled by the illustrated apparatus comprise the vamp, the quarters, the vamp lining and the quarter linings.

The assembly is accomplished at stations 10 and 12. As hereinafter discussed in greater detail, the vamp and quarters linings are precisely and automatically positioned on an intermittently translated conveyor belt 16 by the operative instrumentalities of station 10. The vamp and quarter are accurately positioned in overlying relation to their respective linings by the operative instrumentalities of station 12. The construction and function of stations 10 and 12 are essentially identical except for the pick-up means employed to locate the shoe upper components on the conveyor belt. Vacuum means may be used to pick-up and locate conventional leather vamps and quarters whereas it is not possible to employ vasuum means on the sonventional pervious linings therefor.

The lonveyor belt 16 introdues the assembled vamp, quarters and linings therefor to a high frequency activating unit 20 wherein adhesive previously applied to either the vamp and tongue or their linings is activated to obtain an adhesive joinder of the upper components. The adhesive may be pre-applied by conventional means as desired. The quantity and distribution of the adhesive may be such as to produce a permanent bond of sufficient strength to be acceptable in a finished shoe or a temporary bond capable of securing the upper assembly while it is stitched. The choice as to which bond strength is specified is determined by the particular shoe style. The importance of the apparatus is, however, not diluted by the fact that upper stitching sometimes follows in order to attain certain style features. The stitcher is relieved of the tedious, taxing task of accurately positioning each component of the upper during the stitching operation. The temporary bond is sufficient to secure the components together prior to and during the stitching operation whereby to diminish the time required for stitching and the level of skill which must be possessed to complete the same.

The adhesive used may be any convenient type which can be activated by high frequency or dielectric means. The high frequency unit may also be of any convenient, conventional type.

The assembled and bonded upper assembly is thereafter removed from the intermittently fed conveyor belt 16 at an unloading station 22. The construction of the unloading station is essentially identical to the construction of stations 10 and 12. Vacuum pick-up means may be used to unload the generally impervious, bonded upper assembly.

The apparatus illustrated in FIGS. 1–6 is supported on an elongated base 26 comprising a plurality of table-like portions which form the various stations. Each of the table like portions includes upright members 28, transverse braces 30, 30 and upper and lower stringers 32, 32 which link the plurality of table-like members. This construction permits the inclusion of additional stations if additional components are to be included in the upper assemblage.

As best illustrated in FIGS. 1, 3 and 6, the conveyor belt is intermittently translated between trays 40, 40 located on opposite sides thereof at each of the assembly stations 10 and 12. In the preferred embodiment illustrated, each of the stations includes a pair of identical trays 40 on each side whereby two uppers may be assembled simultaneously. That is, as particularly shown in FIGS. 4 and 6, each station includes two trays 40 on each side of the conveyor belt 16. As viewed in FIG. 6, the orientation of the trays on a given side is reversed. This construction is employed merely to increase the production rate of the apparatus.

The trays 40, 40 are accurately located on the table top 42 of each station on locating supports 44, 44. Each of the trays 40 is an injection molded plastic form having a precisely located cavity 46 (FIGS. 1 and 6) in the central portion thereof. The cavities 46 correspond in configuration to the shape of the particular shoe upper component to be stored by the tray. The depth of the cavity is sufficient to store a quantity of like shoe upper components. The precise location of the cavity 46 in the tray 40 and the precise location of the tray on the supports 44 is of critical importance as this determines the location at which the upper components will be deposited or placed on the conveyor belt 16. In the preferred embodiment illustrated, the cavities 46 of the trays 40 shown in the first station 10 (see FIG. 1) correspond in configuration to the shape of the quarter linings. The cavities of the trays on the opposite side of the belt at station 10 (not shown) have a configuration corresponding to that of the vamp lining. At station 12, the trays 40 shown or visible in FIG. 1 have cavities shaped to receive vamps whereas the trays on the opposite side of the belt 16 (not shown) have cavities corresponding to the shape of the quarters.

The means employed on the locating supports to precisely and consistently locate trays may take a variety of forms but preferably comprise a plurality of upstanding locating pins (not shown). If preferred, alternate means of precisely locating the shoe upper components may be employed including means to which the upper components may be automatically fed from appurtenant cutting, cementing or the like means.

The conveyor belt 16 comprises a pervious or apertured belt mounted on rollers 50, 50 (FIGS. 1, 2 and 3) journaled at opposite ends of the apparatus. As illustrated in FIGS. 2 and 3, the rollers 50, 50 are mounted on shafts 52, 52 journaled in the frame 26 to permit rotary movement. The belt 16 is confined or guided within a trough formed in the upper portion of a hold-down member 60 during its traverse of the operating stations. The precisely dimensioned trough is formed by upstanding members 62, 62 on the upper portion of the hold-down member 60. The hold-down member 60 and members 62, 62 extend the full longitudinal length of the apparatus. The hold-down member 60 includes a hollow central portion 66 and has a plurality of longitudinally extending spaced apertures or slots 68 formed in the upper surface thereof. A vacuum is created in the hollow central portion 66 whereby to apply suction through the slots 68 and pervious belt 16 to effect a holding or retaining force on upper components deposited on the belt 16. The precise location of each upper component placed on the belt is thus maintained whereby to ensure proper orientation relative to components subsequently added. The vacuum may be created by any convenient, conventional means.

The motivating or drive means for the belt 16 are illustrated in FIGS. 2, 4 and 5 and are located on the lower portion of the apparatus. The drive means comprises a two-way piston 80 and cylinder housing 82 including clamping means 90, and stationary clamping means 90, and stationary clamping means 92. It is noted for clarification, that FIG. 2 is an end view looking toward the front of the machine at a point between a motivating carriage 86 and the clamping means 92 whereby the clamping means does not appear in FIG. 2.

The motivating carriage 86 comprises a platform 96 movably mounted on support rods 98, 100. The rod 98 has a square cross-section and the rod 100 a circular cross-section. The platform is movably supported on the rods 98 and 100 by depending support means 104 and 106, respectively. The support means 104 comprises a depending member 110 a having a plurality of rollers 112 rotatably mounted in the lower portion thereof. The rollers 112 extend outwardly from the depending member 110 into engagement with the upper and lower surfaces of the square rod 98. Support means 106, 106 comprises two discrete, spaced members which depend from the underside of the platform 96. Each support means 106 includes brackets 118, 118 which hold a sleeve 120 which slidingly receives the circular rod 100.

The motivating carriage 86 also includes the clamping means 90 mounted between brackets 126 extending upwardly from the platform 96. The clamping means 90 comprises a piston 130 and cylinder housing 132 mounted on a support plate 136 extending between the brackets 126. The piston 130 is employed to urge a clamping member 138 into engagement with the belt 16 which passes thereunder. The belt 16 passes over the top of the platform 96 between the platform 96 and the clamping means 138. Downward movement imparted to the piston 132 is translated to the clamping mans 138 by a piston rod 140. When the clamping means 138 is moved toward the platform 96 it engages the bolt 16 whereby to securely clamp the belt in a fixed position on the platform 96. Thus when the platform 96 is translated by means to be hereafter described, the belt 16 is carried or translated with the platform. The movement of the piston 132 is controlled by the introduction and exhaust of air pressure through th epiping ports 150, 152 in a conventional manner by conventional means (not shown).

The platform 96 is translated by means of the two-way piston 80 and a drag cable 84. As illustrated in FIG. 4, the drag cable 84 extends through the cylindrical housing 82 wherein it is rigidly secured to the piston 80. The drag cable is movably mounted on spaced pulleys 154, 155. Opposite ends of the cable 84 are secured to opposite depending ends 156, 158 of a U-shaped bracket 160 mounted on the under side of the platform 96. Thus, when fluid pressure is applied to the right hand end of the piston 80, as viewed in FIG. 4, the resultant movement of the piston 80 and cable 84 will be transferred to the platform 96. The conveyor belt 16 will be moved or translated with the platform 96 when it is clamped between the clamping member 138 and platform 96. The stroke of the piston 80 within the cylinder 82 is of a length sufficient to progress the conveyor belt 16 the distance required to advance the shoe upper components thereon to the next operating station. Conventional means are employed to apply fluid pressure to the piston 80 and to coordinate the application of such fluid pressure with the application of fluid pressure to the piston 130 which controls the clamping member 138.

When the piston 80 has completed its stroke from the position shown in FIG. 4 to the opposite end of the cylindrical housing 82, the fluid pressure is eliminated from both the piston 80 and the piston 132. The stroke of the piston 80 will have carried the platform 90 from the position illustrated in FIG. 4 to a point approximately above the pulley 155.

The stationary clamping means 92 functions to retain the conveyor belt 16 is fixed location during the return of the piston 80 and motivating carriage 86 including the platform 96 from the positions described in the preceding paragraph to the positions shown in FIG. 4. The stationary clamping means 92 corresponds generally to the clamping means 90 and comprises a piston 170, a piston housing 172, a piston rod 174 anda clamping member 176. When fluid pressure is applied to the upper surface of the piston 170, the clamping member 176 is urged into engagement with the belt 16 whereby the belt 16 is clamped in a fixed position on a stationary support 180.

Upon completion of the conveyor betl 16 motivating stroke of the piston 80, fluid pressure is applied to the upper surface of the piston 170 whereby the belt 16 is clamped in a stationary position by the clamping means 176, and to the lower surface of the piston 132 whereby to move the clamping means 138 away from the belt 16 such that it is no longer clamped on the platform 96, and also to the left hand end of the piston 80, as viewed in FIG. 4. The piston 80 and motivating carriage 86 can thus be returned to the positions shown in FIG. 4 without movement of the belt 16. That is, the application of fluid pressure to the left hand end of the piston 80 urges the piston 80 to the right, as viewed in FIG. 4, whereby the platform 96 is conveyed to the left or rearwardly by the dray cable 86.

The application of fluid pressure to the motivating or drive means just described, including the control and sequence thereof, may be accomplished by any convenient, conventional means. In the preferred embodiment, fluid logic components are employed.

It is to be noted for later reference that the upper components are deposited on the intermittently translated conveyor belt 16 during the return stroke of the piston 80. Conventional fluid logic or electrical components may be utilized to ensure precise, sequential operation of the operative instrumentalities of the apparatus of this invention. Since these components do not constitute a part of this invention, the specific components empoyled will not be described in detail.

As previously noted, the construction of the operative instrumentalities or fabric handling heads of the stations 10, 12 and 22 are essentially identical except for the pick-up means employed. Each of the fabric handling heads 200 is movably mounted for translation transversely of the conveyor belt 16. The heads 200 include a plurality of pick-up members 202. In the illustrated preferred embodiment, a total of four pick-up members 202 are mounted on each head 200 (see particularly FIG. 6). The pick-up members 202 are movably mounted for vertical movement, toward and away from the trays 40, in main body or H-shape members 206. The pick-up members 202 are mounted at the extremities of the arms 208 of the H-shaped members. The discussion to follow will be directed to a single head 200, it being understood that the construction, with the exception of the pick-up members 202, is identical for the stations 10, 12 and 22.

The central portion 210 of the H-shaped member has depending portions 212, 212 (FIG. 2) at opposite ends thereof each having a sleeve 214 (FIG. 4) mounted therein. The sleeves 214 are slidingly received on a rod 220 mounted on the frame 26 of the apparatus by support members 222, 222 and 224. The support members 222, 222 are simply upright extensions of the frame extending between the trays 40, 40 on opposite sides of the conveyor belt 16. Opposite ends of the support member 224 are affixed to the members 222, 222 whereby the member 224 extends transversely of the belt 16 between the trays 40 on each side of the belt 16 at each station. The rod 220 is rigidly fixed on the upper surface of the support member 224 and extends transversely of the belt 16 (see particularly FIGS. 2 and 3). The fabric handling head 200, more specifically the H-shaped frame member 206 thereof, is thus mounted for sliding movement transversely of the conveyor belt 16 on the rod 220. As will be hereinafter discussed in greater detail, the length and position of the rod 220 and the mounting of the sleeves 214 and H-shaped member thereon is such that the pick-up members 202 on each side of the H-shaped member may be sequentially used in tandem to transfer upper components from the trays 40 to a predetermined position on the conveyor belt 16.

Each fabric handling head 200 is moved between operative positions on the rod 220 by means of a motor comprising a piston 240 (FIG. 6) mounted in a cylindrical housing 242 which is secured to the underside of the depending portions 212, 212 of the H-shaped member 206 by fastening means 246 (FIG. 4). An end of the piston rod 248 of the piston 240 is rigidly connected to the stationary support 224 by a bracket 250. Conventional means are employed to apply the requisite fluid pressure for operating the motor by moving the cylinder 242 relative to the piston 240.

The positioning of the pick-up members 202 in precise location above the trays 40 is accomplished by means of a foot 260 which depends from the central portion 210 of the H-shaped member 206. The foot 260 also functions, as hereinafter discussed, as an anti-rotation support for the fabric handling head 200. As seen in FIGS. 2 and 3, the foot 260 depends from the mid-section of the portion 210 of the H-shaped member 206. A follower 264 is carried on the lower end of the foot 260. Engagement of the follower 264 with an anti-rotation plate 266 prevents or minimizes rocking movement of the pick-up head 200 on the rod 220. The anti-rotation plate 266 is affixed and extends parallel to the support 224. Stop members 268, 268 secured to opposite ends of the anti-rotation plate 266 determine the extent of movement of the H-shaped member 206 and, therefore, the pick-up head 200. That is, the terminal or operative positions of the head 200 on opposite sides of the conveyor belt 16 are respectively established by engagement of the follower 264 with the stops 268, 268. The stops are located on the plate 266 on opposite sides of the conveyor belt 16 and are positioned such that the pick-up members 202 on the operative (pick-up) side of the head 200 will be precisely positioned above the cavities 46 in the trays 40 when the follower engages the appropriate stop 268. More specifically as viewed in FIGS. 2 and 3 for example, when the follower 264 is in engagement with the stop 268 on the right-hand side of the conveyor belt 16, the two pick-up members 202 on right-hand end of the head 200 (only one right-hand pick-up member 202 shown in FIGS. 2 and 3) will be located above the trays on the right-hand side of the conveyor belt 16. Further, again as viewed in FIGS. 2 and 3, the two pick-up members 202 on the left hand end of the head 200 will be located above the conveyor belt 16 in position to deposit upper components thereon, when the follower 264 is in engagement with the stop 268 on the right-hand side of the conveyor belt. Conversely when the follower 264 is in engagement with the stop 268 on the left-hand side of the belt 16, the right and left hand pick-up members 202 on the head 200 will be positioned above the trays 40 and belt 16, respectively. Thus, the pick-up members may be employed to simultaneously pick-up components from the trays 40 and deposit components on the belt 16.

The precise control of the location of the upper components on the conveyor belt obtained by the construction just described in combination with the trays 40, ensures consistent product quality. The ability to quickly locate the upper components in precise location by the mere placement of the trays 40 on locating means provides an efficient manufacturing system requiring relatively unskilled labor. The high degree of accuracy in positioning the upper components in a predetermined location on the conveyor belt and the vacuum hold down means, ensures consistency in product.

In the preferred embodiment conventional means (not shown) are employed at the stops 268, 268 in association with appropriate, conventional fluidic components to control and coordinate the fluid pressure applied to the piston 240 which controls movement of the fabric pick-up head 200, the piston 80 and appurtenant means heretofore described which control translation of the conveyor belt 16 and means to be described which control the pick-up members 202. Various conventional means such as fluidic means may be used to coordinate and obtain the above described movement and the dwell periods required in operation of the apparatus.

As discussed above, the construction of the pick-up member 202 is determined by the type of material or fabric to be handled. If the fabric is impervious, vacuum means may be employed. The fabric must, however, be pierced or impaled on the pick-up means if it is pervious. Shoe lining material is pervious and therefore must be impaled on the pick-up means.

The leather components are substantially impervious and consequently vacuum pick-up means may be employed. Vacuum pick-up members 202 are illustrated on the apparatus in FIGS. 1, 2, 3, 4 and 6. Impaling pick-up means are illustrated in FIGS. 7 to 10. An alternate form of impaling pick-up means is illustrated in FIGS. 11 and 12.

The vacuum pick-up means comprises a plurality of heads 300 mounted on a base plate 302. Each of the heads 300 includes a rubber cup-like member 304 slidingly mounted on one end of a tubular member 306. The tubular member 306 extends through a slot 308 in the base plate 302 and is retained in position by means of nuts 310, 310. The nuts 310, 310 are mounted on a threaded section of the tubular member and are located on opposite sides of the plate 302 whereby they may be employed to clamp the head 300 in a fixed position. Spring means 312 disposed between the nut 310 on the underside of the base plate 302 and the member 304 bias the member 304 outwardly from the plate 302. The rubber cup-like member 304 is retained on the member 306 by coperative flange means (not shown) on a collar 316 attached to the member 304 and on the end of the tubular member 306. Thus, when the heads 30 0are lowered into the pick-up position, as hereinafter described, the cup-like members 304 resiliently engage a upper component to be moved.

The plurality of heads 300 may be mounted in the plate 302 in any pattern required or dictated by the configuration of the particular upper component or components to be handled. The embodiment illustrated in FIG. 6 comprises a plate 302 having apertures and slots therein which permit the distribution of three heads 300 in an essentially triangular pattern. The use of slots in the plate 302 provides flexibility in head 300 distribution. The distribution pattern illustrated in FIG. 6 is particularly useful in picking up vamp components. A variety of plate 302 constructions can be employed to obtain a desired distribution pattern for any required number of heads 300.

Each of the heads 300 is connected to a vacuum source by connecting hose 320 which links the heads to each other and to the vacuum source. Conventional connecting members 322 are affixed to an end of each tubular member 306 and used for securing the hose 320 thereto. Thus, each of the heads 300 is capable of applying suctional force to a predetermined location on an upper component whereby to securely retain the upper component in contact with the rubber cup-like member 304. Fluidic means are preferably employed to coordinate the introduction of the suctional force with the disposition of the heads 300 in the pick-up position. Simliarly, fluid means are preferably employed to release the suctional force when the pick-up members 202 are positioned to deposit an upper component on the conveyor belt 16.

Each of the base plates 302 is mounted on the head 200 for vertical movement relative to the trays 40 and belt 16. Vertical movement is imparted to each of the pick-up members 202 and thus to the plates 302 by a piston (not shown) housed within a drive cylinder 330 mounted in the end of each arm 208 of the H-shaped member 206. A piston rod 332 (FIGS. 2, 3 and 6) extends from the lower end of the cylinder on the underside of the arm 208. The piston rod 332 has an elongated mounting bar 336 (FIGS. 4 and 6) attached to the lower end thereof which extends substantially parallel to the arm 208. The plates 302 are affixed to the mounting bars 336 by means of clips 340, 340 which snap over lips 342, 342 (FIG. 6) on opposite ends of the bars 336. The clips 340, 340 are secured to opposite ends of elongated blocks 346 secured to the upper surface of the plates 302. The plates 302 can thus be readily and easily attached and removed from the head 200 to permit rapid changeover of the apparatus to handle different types of articles.

The application of fluid pressure to the piston within the housing 330 is again preferably controlled by fluidic means which coordinate the operation of the members 202 with the translation of the belt 16, transverse movement of the head 16 and the application of suctional pressure through the tubular members 306. Alined movement of the heads 202 is ensured by alinement rods 334 mounted on the bars 336 and slidingly received in the arms 208.

As noted above, pick-up means which may be generally described as of the impaling type are illustrated in FIGS. 7 to 10 and 11, 12. These pick-up means comprise, in common, heads 400, 402, respectively, which may be attached by any convenient means to base plates of the type identified by the reference character 302 or of any other desired construction. A plurality of similar heads 400 or 402 would normally be required on each base plate. The attachment of the base plate to the elongated bar 336 would be accomplished in the manner just described in re the vacuum pick-up means and therefore will not be discussed further.

The pick-up heads 400 illustrated in FIGS. 7 to 10 comprise a face plate 410, a lower housing 412 having a pressure cavity 414 therein, a diaphragm 418, and a plurality of impaling members 420. The face plate 410 and housing 412 are secured together with the diaphragm 418 at the interface therebetween by fastening members 424. The pressure cavity 414 is centrally located in the housing 412 such that it is overlaid by the diaphragm 418 and is essentially alined with a piping port 426 in the face plate 410. An annular sleeve 430 having a tapered upper end 432 is positioned in the cavity 414. The sleeve 430 has a pluarity of slots 434 in a lower ened thereof in alinement with a plurality of passageways 436 in which the impaling members 420 are slidingly housed.

The impaling members 420 comprise a plurality of leaf-spring like members having one end 440 thereof extending on the upper surface of the housing 412 beneath the diaphragm. The terminal portion 442 of the end 440 is fixed in an anchoring hole in the housing 412. There are two looped sections 446, 448 in the member 420; one 446 of which is located in a well 444 in the housing and the second 448 in the cavity 414. The opposite end 450 of the impaling members extend angularly from the housing 412 and terminates in a point upon which upper components may be impaled.

When it is desired to impale an upper component on the members 420, fluid pressure is applied to the diaphragm 418 through the piping port 246. The diaphragm 418 is thereby distorted from its normal contour shown in FIG. 8 to the depressed contour shown in FIG. 9. Depression of the diaphragm as shown in FIG. 9, urges the impaling members 420 outwardly into the operative, impaling position. Upon release of the fluid pressure, the impaling members are retracted into the passageways 436 and an impaled member disengaged.

The pick-up heads 402 comprise a face plate 510, a lower housing 512, a diaphragm 518, and a plurality of impaling members 520. The housing 512 includes an annular core 522 having a plurality of quadrants 524 extending radially outwardly therefrom. The quadrants 524 are separated by channels in which the members 520 are mounted for pivotal movement on studs 530. FIGS. 11 and 12 are sectional views taken through channels lying on opposite sides of the core 522.

An I-shaped member 532 is movably mounted in the cavity 534 formed above the core 522 between the quadrants 524. The member 532 is normally urged toward an upper end of the cavity 534 by a spring 538. One end of the spring 538 is mounted in a U-shaped bracket 539 movably mounted above the core 522 in a cavity 540 of smaller diameter than the cavity 534. The opposite end of the spring 538 engages the underside of the member 532 and is held in position by a pin 544. The position of the U-shaped bracket 539 on the cavity 540 and therefore the spring tension may be determined by adjusting a set screw 550.

An end 554 of each of the impaling members 520 is received in the annular slot 556 formed in the I-shaped member 532. Accordingly, vertical movement of the member 532 will pivot the impaling members 520 about the studs 530. Vertical movement may be imparted to the member 532 by the application of fluid pressure to the diaphragm 518 through the piping port 560. Upon the application of fluid pressure, the diaphragm 518 is distorted from its normal, relaxed position shown in FIG. 11 to the depressed position shown in FIG. 12. Depression or distortion of the diaphragm is translated to the member 532 whereby to urge the member 532 downwardly and thus to pivot the impaling members 520 into operative position. Upon release of the fluid pressure, the member 532 and therefore the impaling members 520 are returned to the inoperative position shown in FIG. 11 under the action of the spring 538.

In the illustrated preferred embodiment, each of the impaling members 520 has a saw-tooth pick-up tool 568 secured to one end thereof. This construction has been found proficient in impaling previous upper components. A total of four members 520 are utilized in each pick-up head 402. The number of heads 402 employed may be varied depending on the configuration of the component to be handled.

In the use of the above described apparatus, the trays 40 are initially filled with a quantity of components. Each tray 40 is replaced by a filled tray during operation when its supply of components is exhausted. As described above, the conveyor belt 16 is intermittently fed between the trays 40 in the operation of the apparatus. During the dwell period in translation of the belt, the pick-up members 202 move vertically into operative position relative to the trays 40 and the belt 16. The members 202 above the belt 16 deposit upper components thereon and the members 202 above the trays 40 pick-up components therefrom. The components deposited at station 12 are positioned in precise overlying relation to those deposited at station 10. During this dwell period, the high frequency activation unit activates the adhesive on the upper assemblies exposed thereto. Further, bonded upper assemblies are removed at the unloading station 22.

Each of the fabric handling heads 200 is moved transversely of the conveyor belt 16 to successive operative positions during the periods of conveyor belt 16 movement. The vacuum means retains the upper components on the belt 16 during the translation thereof.

Uppers can thus be efficiently and quickly assembled and bonded without expert labor. Replacement of the trays 40 during operation requires little skill or training. The trays 40 can be precisely positioned relative to the belt 16 with little difficulty. Thereafter, the automatically and precisely controlled stroke of the head 200 accurately deposits the upper components at a predetermined position on the belt 16.

While the apparatus of this invention has been described in an application wherein only a relatively small number of components are assembled and bonded, it is clear that the apparatus can be readily utilized to assemble articles having a large number of components. It is equally clear that the apparatus may be utilized to assemble articles other than shoe uppers and, thus, the invention is not to be construed as limited to the shoe field.

Having thus described our invention, what we claim as new and desire to secure by Letters Patent of the United States is:

1. Apparatus for assembling a multiple component article of commerce comprising a conveyor belt, means for intermittently translating said conveyor belt, a plurality of work stations spaced longitudinally along said conveyor belt each adapted to accommodate a particular component of said multiple component article, means at each of said work stations for precisely locating the components of said article relative to the conveyor belt, component handling heads at each of said work stations for removing the components from said locating means and depositing the components at a predetermined position on the conveyor belt, said heads each comprising a main body member mounted for transverse movement relative to said conveyor belt, a pick-up member movably mounted on said main body member for movement into operative position relative to said locating means and said conveyor belt, means for moving said pick-up member into operative position and means for accurately controlling the movement of said main body member to sequentially position said pick-up member in precise, predetermined position above the locating means and conveyor belt.

2. Apparatus according to claim 1 wherein said handling heads each comprise a plurality of discrete pick-up members each movably mounted on said main body member for movement into operative position relative to said locating means and said conveyor belt and means for accurately controlling the movement of the said main body member to sequentially position each pick-up member in a precise, predetermined position above the locating means and conveyor belt.

3. Apparatus according to claim 1 having vacuum means for retaining the components deposited on the belt in the predetermined position therefor.

4. Apparatus according to claim 1 wherein each of said work stations comprises table-like portions located on opposite sides of said conveyor belt, means mounted on each of said table-like portions for locating a component of the article in a predetermined spacing and orientation relative to said conveyor belt and said heads comprise discrete pick-up members movably mounted on opposite sides of said main body member for movement into position relative to said locating means on opposite sides of the conveyor belt, respectively, and said conveyor belt and means for accurately controlling the movement of the main body member to sequentially position each pick-up member above one of said locating means and the conveyor belt.

5. Apparatus according to claim 1 including a high frequency activation station for activating adhesive on a component of said article, said assembled component being introduced to said activation station while on said conveyor belt.

6. Apparatus according to claim 1 wherein the pick-up member on one of said heads comprises a base plate, a plurality of vacuum applying means mounted in said base plate in a pattern corresponding generally to the outline of the component to be handled, and means for movably mounting said base plate on said main body portion.

7. Apparatus according to claim 1 wherein the pick-up member on one of said heads comprises a base plate and impaling means mounted thereon comprising a housing having a pressure cavity therein, a face plate mounted on said housing, a diaphragm interposed between said face plate and said housing, a plurality of impaling members movably mounted in said housing, and means for urging said diaphragm into said cavity whereby said impaling members are urged into position to impale a component thereon.

8. Pick-up means for use in apparatus for assembling an article of commerce comprising a housing having a pressure cavity therein, a face plate mounted on said housing whereby to overlie said cavity, a resilient diaphragm interposed between said face plate and said housing, a plurality of impaling members movably mounted in said housing, and means for urging said diaphragm into said cavity whereby to urge said impaling members into position to impale a component thereon.

9. Pick-up means according to claim 8 wherein said impaling members each comprise an elongated member having one end thereof secured to the upper end of the housing, a central portion disposed in said cavity, and an impaling end slidingly housed in a passageway in the lower portion of said housing whereby said diaphragm engages said central portion when said diaphragm is urged into said cavity thereby to urge said impaling end outwardly from said housing into impaling position.

10. Pick-up means according to claim 8 wherein the impaling members are pivotally mounted in said housing, a movable member is mounted in said cavity engageable with an end of said impaling members to impart pivotal movement thereto whereby to urge an opposite impaling end into operative position, and said diaphragm is engageable with said movabe member to impart movement thereto when pressure is applied to said diaphragm.

References Cited
UNITED STATES PATENTS

| | | | |
|---|---|---|---|
| 1,953,255 | 4/1934 | Patten | 12—1 |
| 2,034,091 | 3/1936 | Dunbar | 12—1X |
| 2,263,337 | 1/1941 | Kamborian | 12—52 |
| 3,388,412 | 6/1968 | Hanson et al. | 12—52X |

PATRICK D. LAWSON, Primary Examiner